United States Patent
Lu et al.

(10) Patent No.: US 10,194,154 B2
(45) Date of Patent: *Jan. 29, 2019

(54) METHODS AND APPARATUS FOR EMBEDDED QUANTIZATION PARAMETER ADJUSTMENT IN VIDEO ENCODING AND DECODING

(71) Applicant: THOMSON LICENSING DTV, Issy-les-Moulineaux (FR)

(72) Inventors: Xiaoan Lu, Yardley, PA (US); Joel Sole, San Diego, CA (US); Peng Yin, Ithaca, NY (US); Qian Xu, Folsom, CA (US); Yunfei Zheng, San Jose, CA (US)

(73) Assignee: INTERDIGITAL MADISON PATENT HOLDINGS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,617

(22) Filed: Oct. 10, 2017

(65) Prior Publication Data
US 2018/0091822 A1 Mar. 29, 2018

Related U.S. Application Data

(63) Continuation of application No. 13/498,467, filed as application No. PCT/US2010/002630 on Apr. 14, 2011, now Pat. No. 9,819,952.
(Continued)

(51) Int. Cl.
*H04N 19/136* (2014.01)
*H04N 19/176* (2014.01)
(Continued)

(52) U.S. Cl.
CPC ......... *H04N 19/136* (2014.11); *H04N 19/119* (2014.11); *H04N 19/12* (2014.11);
(Continued)

(58) Field of Classification Search
CPC .... H04N 19/124; H04N 19/14; H04N 19/176; H04N 19/18; H04N 19/44; H04N 19/46; H04N 19/61; H04N 19/0009
See application file for complete search history.

(56) References Cited

U.S. PATENT DOCUMENTS

| 5,592,228 A | 1/1997 | Dachiku et al. |
| 6,192,080 B1 | 2/2001 | Sun et al. |

(Continued)

FOREIGN PATENT DOCUMENTS

| EP | 1744541 | 1/2007 |
| WO | WO2008116836 | 10/2008 |

OTHER PUBLICATIONS

ITU-T Telecommunication Standardization Sector of ITU: Advanced Video Coding for Generic Audiovisual Services, Series H: AV and Multimedia Systems, H.264, Mar. 2005, 343 pages.
(Continued)

*Primary Examiner* — Behrooz M Senfi
(74) *Attorney, Agent, or Firm* — Brian J. Dorini; Ronald J. Kolczynski

(57) ABSTRACT

Methods and apparatus are provided for embedded quantization parameter adjustment in video encoding and decoding. An apparatus includes an encoder for encoding picture data for at least a block in a picture. A quantization parameter, applied to one or more transform coefficients obtained by transforming a difference between an original version of the block and at least one reference block, is derived from reconstructed data corresponding to at least the block.

17 Claims, 11 Drawing Sheets

Related U.S. Application Data

(60) Provisional application No. 61/248,541, filed on Oct. 5, 2009.

(51) Int. Cl.

| | | |
|---|---|---|
| *H04N 19/46* | (2014.01) | |
| *H04N 19/61* | (2014.01) | |
| *H04N 19/124* | (2014.01) | |
| *H04N 19/14* | (2014.01) | |
| *H04N 19/18* | (2014.01) | |
| *H04N 19/44* | (2014.01) | |
| *H04N 19/119* | (2014.01) | |
| *H04N 19/12* | (2014.01) | |
| *H04N 19/122* | (2014.01) | |
| *H04N 19/137* | (2014.01) | |
| *H04N 19/147* | (2014.01) | |
| *H04N 19/159* | (2014.01) | |
| *H04N 19/196* | (2014.01) | |
| *H04N 19/463* | (2014.01) | |
| *H04N 19/70* | (2014.01) | |
| *H04N 19/86* | (2014.01) | |

(52) U.S. Cl.
CPC ......... *H04N 19/122* (2014.11); *H04N 19/124* (2014.11); *H04N 19/137* (2014.11); *H04N 19/14* (2014.11); *H04N 19/147* (2014.11); *H04N 19/159* (2014.11); *H04N 19/176* (2014.11); *H04N 19/18* (2014.11); *H04N 19/197* (2014.11); *H04N 19/44* (2014.11); *H04N 19/46* (2014.11); *H04N 19/463* (2014.11); *H04N 19/61* (2014.11); *H04N 19/70* (2014.11); *H04N 19/86* (2014.11)

(56) References Cited

U.S. PATENT DOCUMENTS

| | | | |
|---|---|---|---|
| 6,215,820 | B1 | 4/2001 | Bagni et al. |
| 6,363,113 | B1 | 3/2002 | Faryar et al. |
| 6,628,839 | B1 | 9/2003 | Komiya et al. |
| 6,792,152 | B1 | 9/2004 | Shibata et al. |
| 8,199,812 | B2 | 6/2012 | Ye et al. |
| 9,819,952 | B2 * | 11/2017 | Lu .................. H04N 19/44 |
| 2006/0056508 | A1 | 3/2006 | Lafon et al. |
| 2007/0058714 | A1 | 3/2007 | Noda |
| 2008/0253448 | A1 | 10/2008 | Lin et al. |
| 2009/0110070 | A1 | 4/2009 | Takahashi et al. |
| 2009/0161697 | A1 * | 6/2009 | Wang ............ H04N 21/234354 370/538 |
| 2009/0213930 | A1 * | 8/2009 | Ye .................. H04N 19/176 375/240.03 |
| 2010/0040153 | A1 | 2/2010 | Imanaka et al. |
| 2012/0183053 | A1 | 7/2012 | Lu et al. |
| 2014/0241630 | A1 | 8/2014 | Macinnis et al. |
| 2014/0286403 | A1 | 9/2014 | Nishitani et al. |

OTHER PUBLICATIONS

TM 5 Rate Control and Quantization Control; ISO/IEC JTC1/SC29/WG11 N0400, Apr. 1993.

Hontsch I et al., "Locally Adaptive perceptual Image Coding", IEEE Transactions on Image Processing, IEEE Service Center, Piscataway, NJ, US, vol. 9, No. 9, Sep. 1, 2000, pp. 1475-1478.

Kuo, C., et al., "A Prequantizer with the Human Effect for the DPCM", Signal Processing Image Communication, Elsevier Publishers, Amsterdam, NL, vol. 8, No. 5, Jul. 1, 1996, pp. 433-442.

Oostveen, J., et al., "Adaptive Quantization Watermarking", Proceedings of SPIE, International Society for Security, Steganography, and Watermarking of Multimedia Contents VI 2004, vol. 5306, 2004, pp. 296-303.

Search Report dated Mar. 22, 2011.

* cited by examiner

METHODS AND APPARATUS FOR EMBEDDED QUANTIZATION PARAMETER ADJUSTMENT IN VIDEO ENCODING AND DECODING

CROSS-REFERENCE TO RELATED APPLICATIONS

This application claims the benefit of U.S. Provisional Application Ser. No. 61/248,541, filed Oct. 5, 2009, which is incorporated by reference herein in its entirety.

TECHNICAL FIELD

The present principles relate generally to video encoding and decoding and, more particularly, to methods and apparatus for embedded quantization parameter adjustment in video encoding and decoding.

BACKGROUND

Most video applications seek the highest possible perceptual quality for a given set of bit rate constraints. For instance, in low bit rate applications, such as a videophone system, a video encoder may provide higher quality by eliminating the strong visual artifacts at the regions of interest that are visually more important. On the other hand, in higher bit rate applications, visually lossless quality is expected everywhere in the pictures and a video encoder needs to also achieve transparent visual quality. One challenge in obtaining transparent visual quality in high bit rate applications is to preserve details, especially at smooth regions where the loss of details is more visible than at the non-smooth regions because of the texture masking property of the human visual system.

Increasing the bit rate is one of the most straightforward approaches for improving quality. When the bit rate is given, an encoder manipulates its bit allocation module to spend the available bits where the most visual quality improvement can be obtained. In non-real-time applications such as DVD authoring, the video encoder can facilitate a variable-bit-rate (VBR) design to produce video with a constant quality over time for both difficult and easy video content. In such applications, the available bits are appropriately distributed over the different video segments to obtain constant quality. In contrast, a constant-bit-rate (CBR) system assigns the same number of bits to an interval of one or more pictures despite their encoding difficulty and produces visual quality that varies with the video content. For both VBR and CBR encoding systems, an encoder can allocate bits according to perceptual models within a picture. One characteristic of human perception is texture masking, which explains why human eyes are more sensitive to loss of quality in smooth regions than in textured regions. This property can be utilized to increase the number of bits allocated to smooth regions in order to obtain a high visual quality.

The quantization process in a video encoder controls the number of encoded bits and the quality. It is common to adjust the quality by adjusting the quantization parameters (QPs). The quantization parameters may include a quantization step size, a rounding offset, and a scaling matrix. In the current prior art and existing standards, the quantization parameter values are sent explicitly in the bitstream. The encoder has the flexibility to tune quantization parameters and signal the quantization parameters to the decoder. However, the quantization parameter signaling disadvantageously incurs an overhead cost.

One important aspect in improving perceptual quality is to preserve the fine details, such as film grain and computer-generated noise. It is especially important to the smooth areas where the loss of fine details is highly noticeable. A common approach in existing algorithms is to encode these smooth regions, or the video segments that include smooth regions, at finer quantization step sizes. Although common to the current state of the art across many standards, in the following description we will use the International Organization for Standardization/International Electrotechnical Commission (ISO/IEC) Moving Picture Experts Group-2 (MPEG-2) Standard reference software Test Model, Version 5 (hereinafter referred to as "TM5") to illustrate how higher quality is obtained for smooth regions within a picture.

In TM5, a spatial activity measure is computed for macroblock (MB) j from four 8×8 luminance frame-organized sub-blocks (n=1, . . . , 4) and four luminance field-organized sub-blocks (n=5, . . . , 8) using the original pixel values as follows:

$$act_j = 1 + \min(vblk_1, vblk_2, \ldots, vblk_8), \quad (1)$$

where $$vblk_n = \frac{1}{64} \times \sum_{k=1}^{64} (P_k^n - P_{mean_n})^2, \quad (2)$$

and $$P_{mean_n} = \frac{1}{64} \times \sum_{k=1}^{64} P_k^n, \quad (3)$$

where $P_k^n$ represents the sample values in the $n^{th}$ original 8×8 block. $act_j$ is then normalized as follows:

$$N\_act_j = \frac{2 \times act_j + avg\_act}{act_j + 2 \times avg\_act}, \quad (4)$$

where avg_act is the average value of $act_j$ of the previous encoded picture. On the first picture, avg_act is set to 400. TM5 then obtains $mquant_j$ as follows:

$$mquant_j = Q_j \times N\_act_j, \quad (5)$$

where $Q_j$ is a reference quantization parameter. The final value of $mquant_j$ is clipped to the range [1 . . . 31] and is used to indicate the quantization step size during encoding.

Therefore, in a TM5 quantization scheme, a smooth macroblock with a smaller variance has a smaller value of a spatial activity measure $act_j$ and a smaller value of $N\_act_j$, as well as a finer quantization step size indexed by $mquant_j$. With finer quantization for a smooth macroblock, finer details can be preserved and a higher perceptual quality is obtained. The index $mquant_j$ is sent in the bitstream to the decoder.

The syntax in the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard") also allows quantization parameters to be different for each picture and macroblock. The value of a quantization parameter is an integer and in the range of 0-51. The initial value for each slice can be derived from the syntax element pic_init_qp_minus26. The initial value is modified at the slice layer when a non-zero value of slice_qp_delta is decoded, and is modified further when a non-zero value of mb_qp_delta is decoded at the macroblock layer.

Mathematically, the initial quantization parameters for the slice are computed as follows:

$$\text{Slice}QP_Y = 26 + \text{pic\_init\_qp\_minus26} + \text{slice\_qp\_delta} \quad (6)$$

At the macroblock layer, the value of the quantization parameter is derived as follows:

$$QP_Y = QP_{Y,PREV} + \text{mb\_qp\_delta} \quad (7)$$

where $QP_{Y,PREV}$ is the quantization parameter of the previous macroblock in decoding order in the current slice.

Turning to FIG. 1, a typical quantization adjustment method for improving the perceptual quality in a video encoder is indicated generally by the reference numeral 100. The method 100 includes a start block 105 that passes control to a function block 110. The function block 110 analyzes the input video content, and passes control to a loop limit block 115. The loop limit block 115 begins a loop over each macroblock in a picture using a variable i having a range from 1 to the # of macroblocks (MBs), and passes control to a function block 120. The function block 120 adjusts a quantization parameter for a current macroblock i, and passes control to a function block 125. The function block 125 encodes the quantization parameter and the macroblock i, and passes control to a loop limit block 130. The loop limit block 130 ends the loop over each macroblock, and passes control to an end block 199. Hence, in method 100, the quantization parameter adjustment is explicitly signaled. Regarding function block 120, the quantization parameter for the macroblock i is adjusted based on its content and/or the previous encoding results. For example, a smooth macroblock will lower the quantization parameter to improve the perceptual quality. In another example, if the previous macroblocks use more bits than assigned ones, the current macroblock will increase the quantization parameter to consume fewer bits than what is originally assigned. The method 100 ends after all macroblock in the picture are encoded.

Turning to FIG. 2, a typical method for decoding a quantization parameter and macroblock in a video decoder is indicated generally by the reference numeral 200. The method 200 includes a start block 205 that passes control to a loop limit block 210. The loop limit block 210 begins a loop over each macroblock in a picture using a variable i having a range from 1 to the # of macroblocks (MBs), and passes control to a function block 215. The function block 215 decodes the quantization parameter and a current macroblock i, and passes control to a loop limit block 220. The loop limit block 220 ends the loop over each macroblock, and passes control to an end block 299.

In summary, and as previously described, the existing standards support adjusting picture-level and macroblock-level quantization parameters in the encoder to achieve high perceptual quality. The quantization parameter values are absolutely or differentially encoded and are thus explicitly sent in the bitstream. The encoder has the flexibility to tune quantization parameters and signal the quantization parameters to the decoder. However, the explicit quantization parameter signaling disadvantageously incurs an overhead cost.

SUMMARY

These and other drawbacks and disadvantages of the prior art are addressed by the present principles, which are directed to methods and apparatus for embedded quantization parameter adjustment in video coding and decoding.

According to an aspect of the present principles, an apparatus is provided. The apparatus includes an encoder for encoding picture data for at least a block in a picture. A quantization parameter, applied to one or more transform coefficients obtained by transforming a difference between an original version of the block and at least one reference block, is derived from reconstructed data corresponding to at least the block.

According to another aspect of the present principles, a method in a video encoder is provided. The method includes encoding picture data for at least a block in a picture. A quantization parameter, applied to one or more transform coefficients obtained by transforming a difference between an original version of the block and at least one reference block, is derived from reconstructed data corresponding to at least the block.

According to yet another aspect of the present principles, an apparatus is provided. The apparatus includes a decoder for decoding picture data for at least a block in a picture. A quantization parameter, applied to one or more transform coefficients obtained by transforming a difference between an original version of the block and at least one reference block, is derived from reconstructed data corresponding to at least the block.

According to still another aspect of the present principles, a method in a video decoder is provided. The method includes decoding picture data for at least a block in a picture. A quantization parameter, applied to one or more transform coefficients obtained by transforming a difference between an original version of the block and at least one reference block, is derived from reconstructed data corresponding to at least the block.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
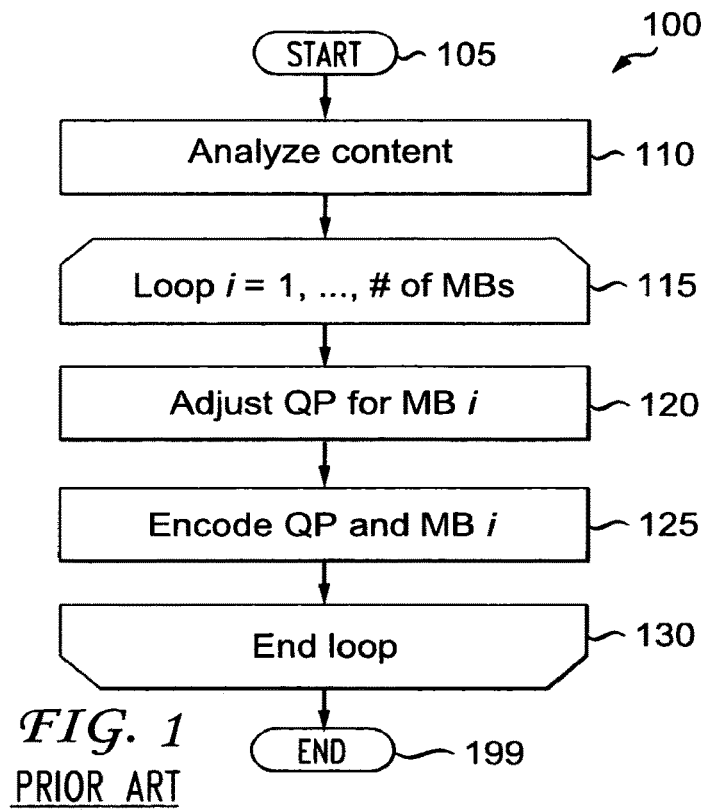
FIG. 1 is a flow diagram showing a typical quantization adjustment method for improving the perceptual quality in a video encoder, in accordance with the prior art.
Figure 2:
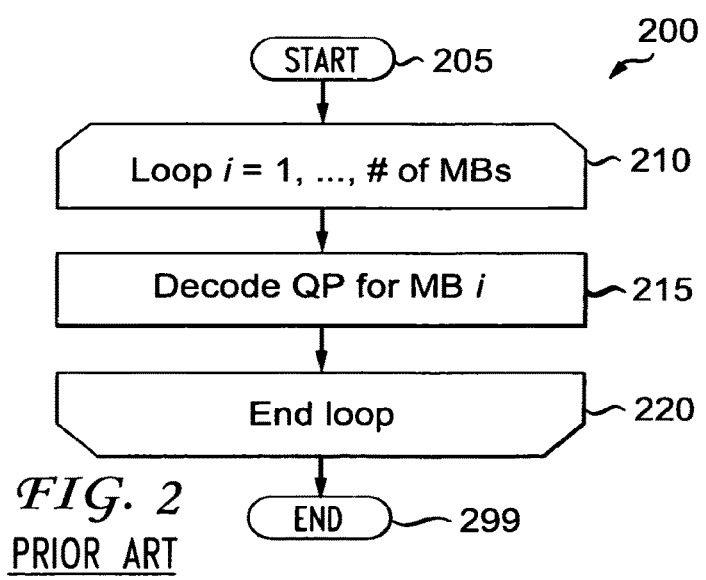
FIG. 2 is a flow diagram showing a typical method for decoding a quantization parameter and macroblock in a video decoder, in accordance with the prior art.

The present principles are directed to methods and apparatus for embedded quantization parameter adjustment in video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the word "signal" refers to indicating something to a corresponding decoder. For example, the encoder may signal one or more quantization parameters in an embedded quantization parameter map in order to make the decoder aware of which particular one or more quantization parameters were used on the encoder side. In this way, the same quantization parameters may be used at both the encoder side and the decoder side. Thus, for example, an encoder may embed a quantization parameter map in a bitstream sent to a decoder so that the decoder may use the same quantization parameters (specified in the map) as the encoder. It is to be appreciated that signaling may be accomplished in a variety of ways. For example, one or more syntax elements, flags, and so forth may be used to signal information to a corresponding decoder.

Moreover, it is to be appreciated that the quantization parameter adjustment process described herein is primarily described with respect to a macroblock for illustrative purposes, the quantization parameter adjustment process of the present principles may be applied to any of a sub-macroblock, a macroblock, a group of macroblocks, or any other coding units. Thus, as used herein, the word "block" may refer to a macroblock or a sub-macroblock. Further, it is to be appreciated that the quantization parameters may be adjusted based on various criteria and so forth including, but not limited to, luma and/or chroma components.

Figure 3:
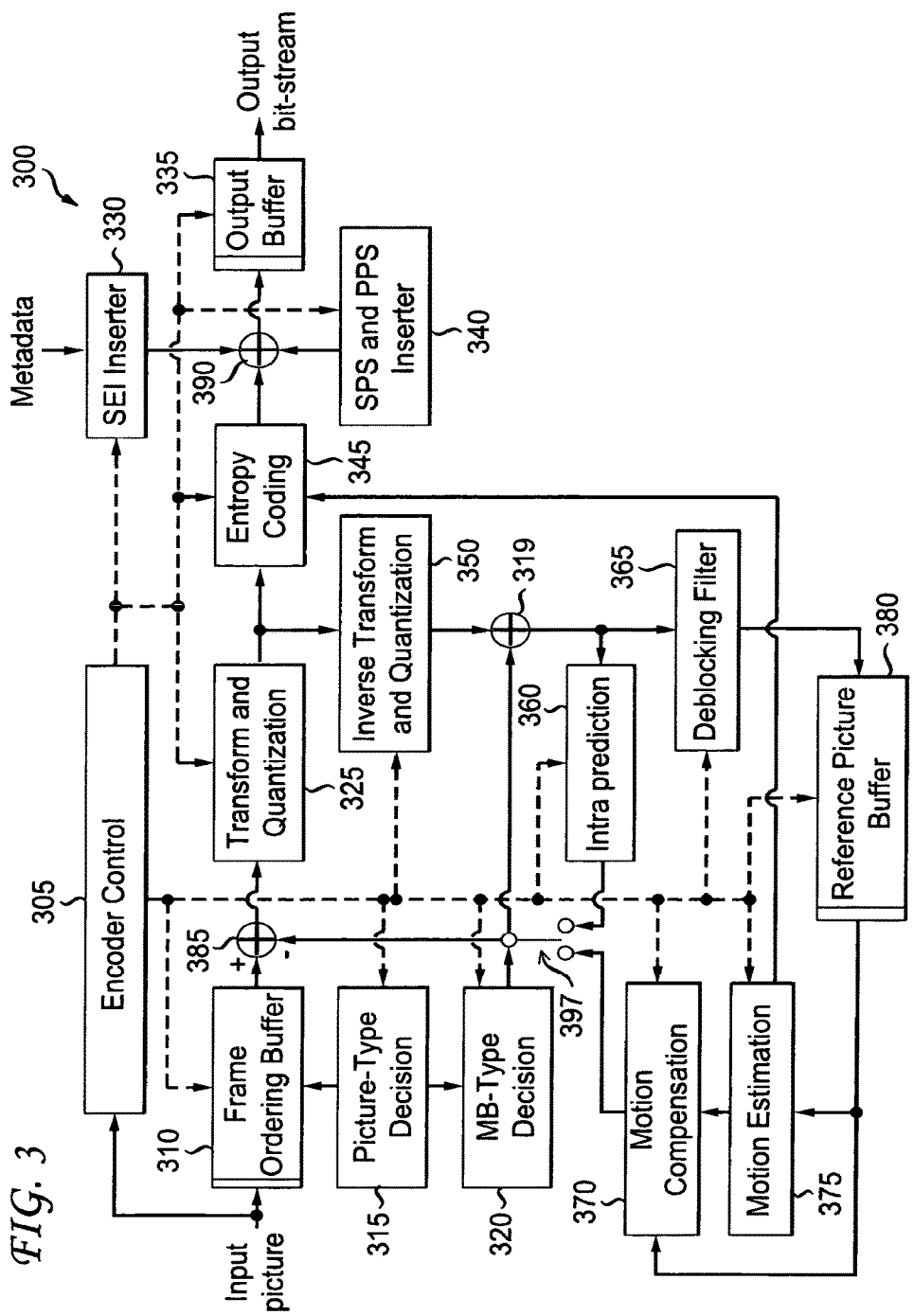
FIG. 3 is a block diagram showing an exemplary video encoder to which the present principles may be applied, in accordance with an embodiment of the present principles.

Turning to FIG. 3, an exemplary video encoder to which the present principles may be applied is indicated generally by the reference numeral 300. The video encoder 300 includes a frame ordering buffer 310 having an output in signal communication with a non-inverting input of a combiner 385. An output of the combiner 385 is connected in signal communication with a first input of a transformer and quantizer 325. An output of the transformer and quantizer 325 is connected in signal communication with a first input of an entropy coder 345 and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse transformer and inverse quantizer 350, an input of a picture-type decision module 315, a first input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller 305 is connected in signal communication with a first input of a Supplemental Enhancement Information (SEI) inserter 330, a second input of the transformer and quantizer 325, a second input of the entropy coder 345, a second input of the output buffer 335, and an input of the Sequence Parameter Set (SPS) and Picture Parameter Set (PPS) inserter 340.

An output of the SEI inserter 330 is connected in signal communication with a second non-inverting input of the combiner 390.

A first output of the picture-type decision module 315 is connected in signal communication with a third input of the frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375 and a third input of the motion compensator 370. A first output of the motion estimator 375 is connected in signal communication with a second input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and an inverting input of the combiner 385.

A first input of the frame ordering buffer 310 and an input of the encoder controller 305 are available as inputs of the encoder 100, for receiving an input picture. Moreover, a second input of the Supplemental Enhancement Information (SEI) inserter 330 is available as an input of the encoder 300, for receiving metadata. An output of the output buffer 335 is available as an output of the encoder 300, for outputting a bitstream.

Figure 4:
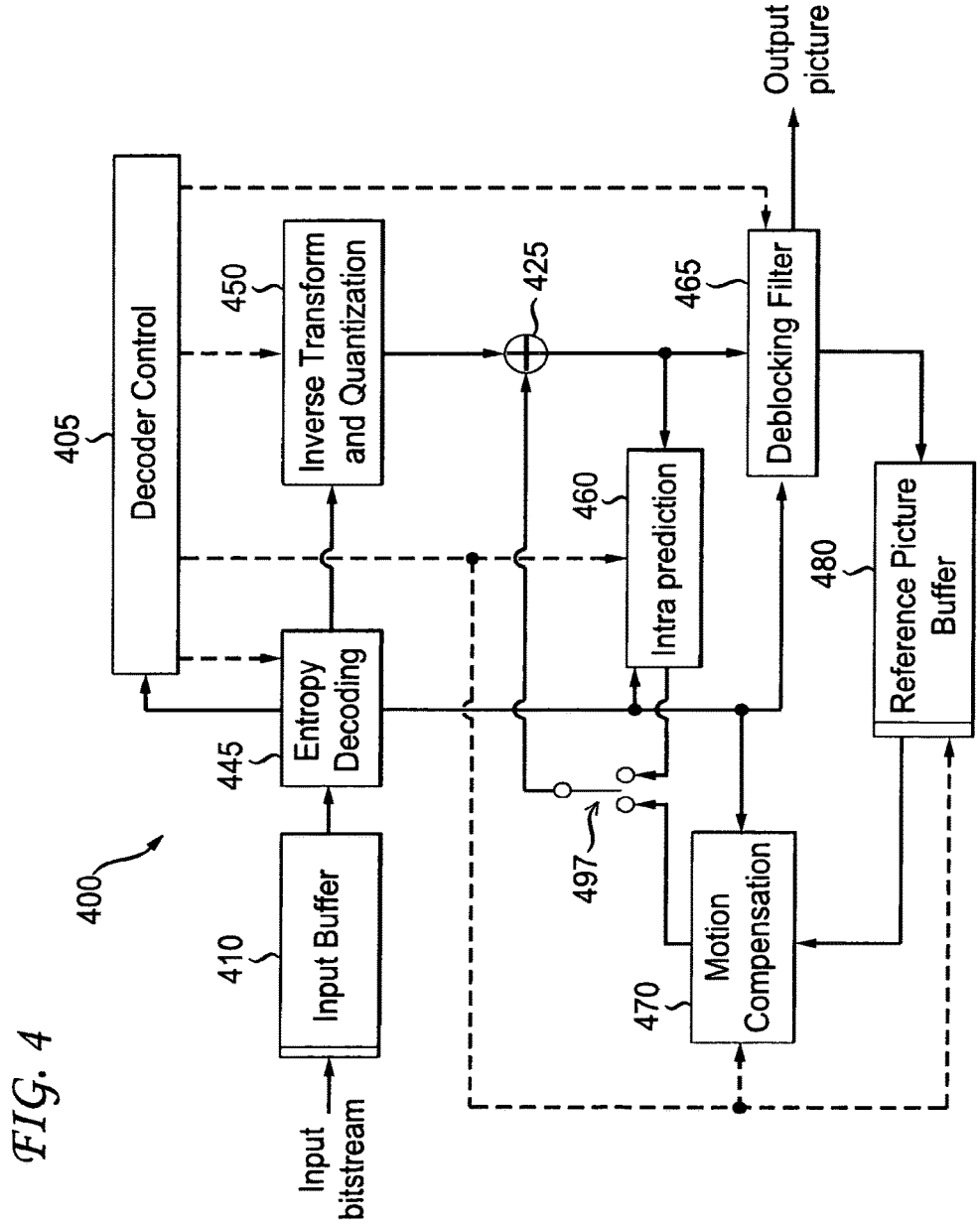
FIG. 4 is a block diagram showing an exemplary video decoder to which the present principles may be applied, in accordance with an embodiment of the present principles.

Turning to FIG. 4, an exemplary video decoder to which the present principles may be applied is indicated generally by the reference numeral 400. The video decoder 400 includes an input buffer 410 having an output connected in signal communication with a first input of an entropy decoder 445. A first output of the entropy decoder 445 is connected in signal communication with a first input of an inverse transformer and inverse quantizer 450. An output of the inverse transformer and inverse quantizer 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder 445 is connected in signal communication with a third input of the motion compensator 470, a first input of the deblocking filter 465, and a third input of the intra predictor 460. A third output of the entropy decoder 445 is connected in signal communication with an input of a decoder controller 405. A first output of the decoder controller 405 is connected in signal communication with a second input of the entropy decoder 445. A second output of the decoder controller 405 is connected in signal communication with a second input of the inverse transformer and inverse quantizer 450. A third output of the decoder controller 405 is connected in signal communication with a third input of the deblocking filter 465. A fourth output of the decoder controller 405 is connected in signal communication with a second input of the intra prediction module 460, a first input of the motion compensator 470, and a second input of the reference picture buffer 480.

An output of the motion compensator 470 is connected in signal communication with a first input of a switch 497. An output of the intra prediction module 460 is connected in signal communication with a second input of the switch 497.

An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

As noted above, the present principles are directed to methods and apparatus for embedded quantization parameter adjustment in video encoding and decoding. For example, in one or more embodiments, we disclose methods and apparatus for embedding quantization parameters in the bitstream at the encoder and reconstructing the quantization parameters using previously decoded contents at the decoder. The same quantization parameter adjustment process is used at the encoder and decoder without explicitly sending quantization parameter information. This results in improved perceptual quality in the reconstructed video with little or no block-level quantization parameter overhead. Also, embedding adjusted block-level quantization parameters in accordance with the present principles in addition to the aforementioned explicit block-level quantization parameters used by the prior art can provide additional quantization parameter adjustment flexibility.

Embedded Quantization Parameter Adjustment

As previously stated, in accordance with the present principles we propose to embed quantization parameters in the bitstream in order to reduce the overhead cost of signaling quantization parameter information. Thus, in distinction to the current state of the art in which the quantization parameters are explicitly conveyed to the decoder, in accordance with the present principles the quantization parameters are implicitly derived from the reconstructed data using the same method at both the encoder and decoder. Further, in one or more embodiments, adjusted and embedded quantization parameters in accordance with the present principles can be used in conjunction with the aforementioned explicitly signaled quantization parameters of the prior art to obtain further flexibility among other advantages readily apparent to one of ordinary skill in this and related arts.

Embodiment 1

To improve the perceptual quality, the quantization parameters need to be adjusted based on the global property of the picture and the local property of individual blocks. As used herein, the phrase "global property" refers to a property derived from all blocks within the picture. For example, a global property can be, but is not limited to, the average variance or average pixel value of the picture. Moreover, as used herein, the phrase "local property" refers to a property of a macroblock. For example, a local property can be, but is not limited to, the variance or the average pixel value of a macroblock. Examples of how the global property of the picture and local property of the individual blocks are calculated are described below. Again, as noted above, while examples of the present principles are described herein for illustrative purposes relating to a macroblock, other coding units such as sub-macroblocks, groups of macroblocks, and so forth may also be used in accordance with the present principles, while maintaining the spirit of the present principles. Advantageously, the present principles allow for an improvement in the quality of regions where a loss of quality is more noticeable and can optionally allow a reduction in the quality of the remaining regions (or portions thereof) to save bits.

Figure 5:
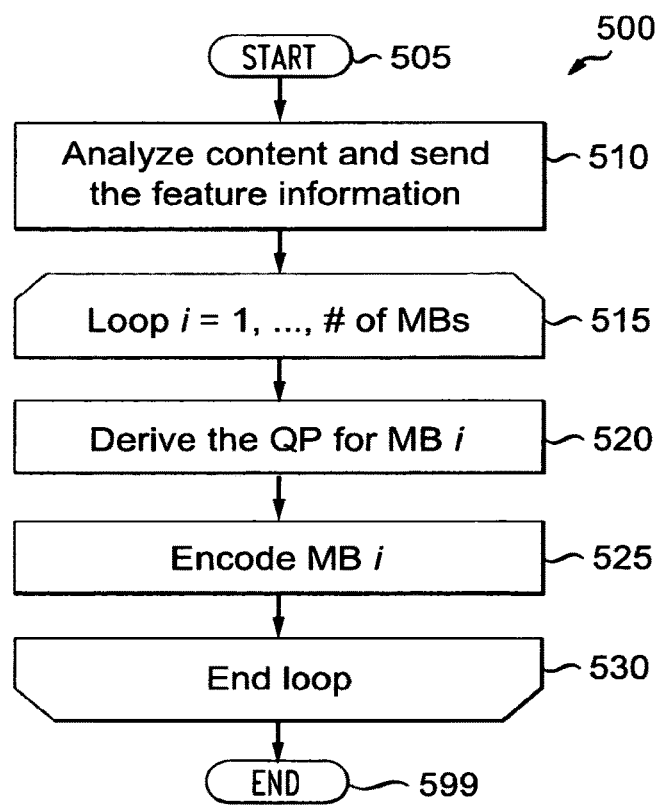
FIG. 5 is a flow diagram showing an exemplary method for embedding a quantization parameter map in a bitstream, in accordance with an embodiment of the present principles.

Turning to FIG. 5, an exemplary method for embedding a quantization parameter map in a bitstream is indicated generally by the reference numeral 500. The method 500 includes a start block 505 that passes control to a function block 510. The function block 510 analyzes input video content, sends global feature information determined from the preceding analysis, and passes control to a loop limit block 515. The loop limit block 515 begins a loop over each macroblock in a picture using a variable i having a range from 1 to the # of macroblocks (MBs), and passes control to function block 520. The function block 520 derives the quantization parameter for a current macroblock i using the global feature information, and passes control to a function block 525. The function block 525 encodes the current macroblock i using the derived quantization parameter, and passes control to a loop limit block 530. The function block 530 ends the loop over each of the macroblocks, and passes control to an end block 599.

Figure 6:
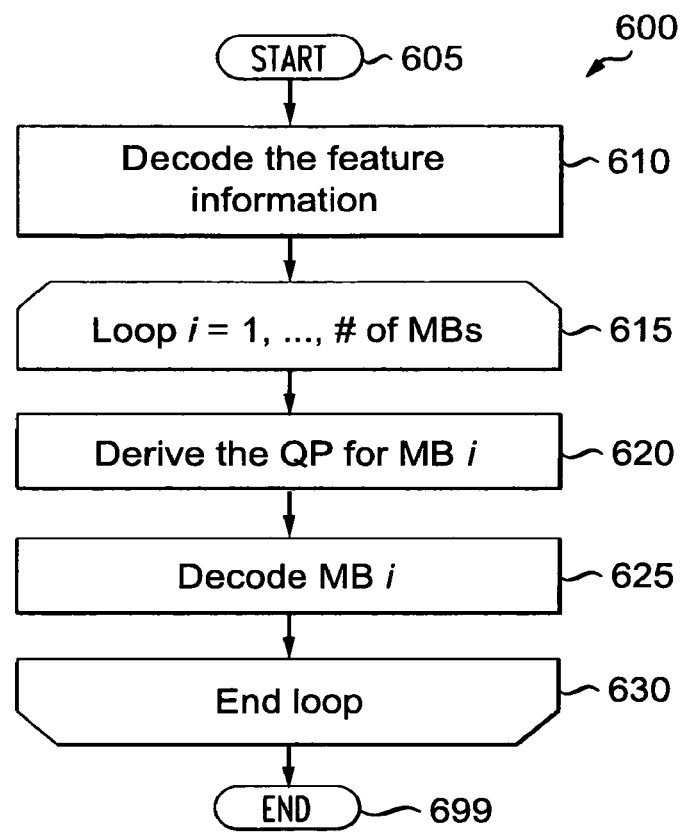
FIG. 6 is a flow diagram showing an exemplary method for decoding an embedded quantization parameter map, in accordance with an embodiment of the present principles.

Turning to FIG. 6, an exemplary method for decoding an embedded quantization parameter map is indicated generally by the reference numeral 600. The method 600 includes a start block 605 that passes control to a function block 610. The function block 610 decodes global feature information from a received bitstream, and passes control to a loop limit block 615. The loop limit block 615 begins a loop over each macroblock in a picture using a variable i having a range from 1 to the # of macroblocks (MBs), and passes control to function block 620. The function block 620 derives the quantization parameter for a current macroblock i, and passes control to a function block 625. The function block 625 decodes the current macroblock using the derived quantization parameter, and passes control to a loop limit block 630. The loop limit block 630 ends the loop over each macroblock, and passes control to an end block 699.

Embodiment 2

To provide more flexibility in the quantization parameter adjustment, an embodiment is described that supports explicit quantization parameter adjustment on a macroblock level in addition to the embedded QP.

Figure 7:
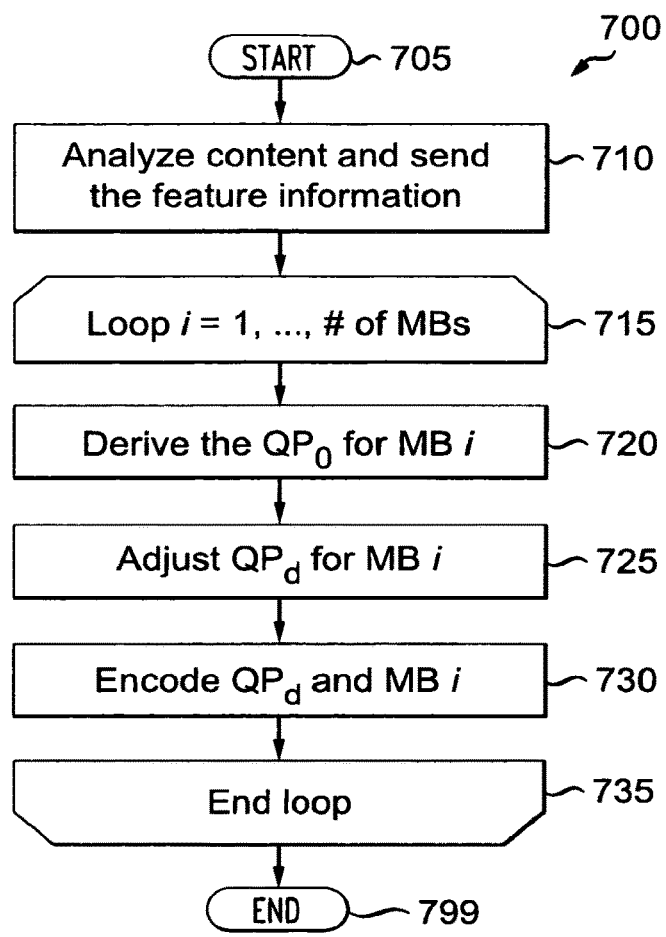
FIG. 7 is a flow diagram showing an exemplary method for encoding an explicit quantization parameter adjustment in conjunction with the use of an embedded quantization parameter map, in accordance with an embodiment of the present principles.

Turning to FIG. 7, an exemplary method for encoding an explicit quantization parameter adjustment in conjunction with the use of an embedded quantization parameter map is indicated generally by the reference numeral 700. The method 700 includes a start block 705 that passes control to a function block 710. The function block 710 analyzes input video content, sends global feature information, and passes control to a loop limit block 715. The loop limit block 715 begins a loop over each macroblock in a picture using a variable i having a range from 1 to the # of macroblocks (MBs), and passes control to function block 720. The function block 720 derives a quantization parameter $QP_0$ for a current macroblock i, and passes control to a function block 725. The function block 725 adjusts a quantization parameter offset $QP_d$ for the current macroblock i, and passes control to a function block 730. The function block 730 encodes the quantization parameter offset $QP_d$ and macroblock i, and passes control to a loop limit block 735. The loop limit block 735 ends the loop over each macroblock, and passes control to an end block 799. Thus, in accordance with method 700, after the quantization parameter $QP_0$ is derived for the macroblock by the function block 720, then the function block 725 can further tune the macroblock-level quantization parameter by the quantization parameter offset $QP_d$. Regarding function block 730, the macroblock is encoded at a quantization parameter of $QP_0 + QP_d$, and the offset $QP_d$ is also encoded.

Figure 8:
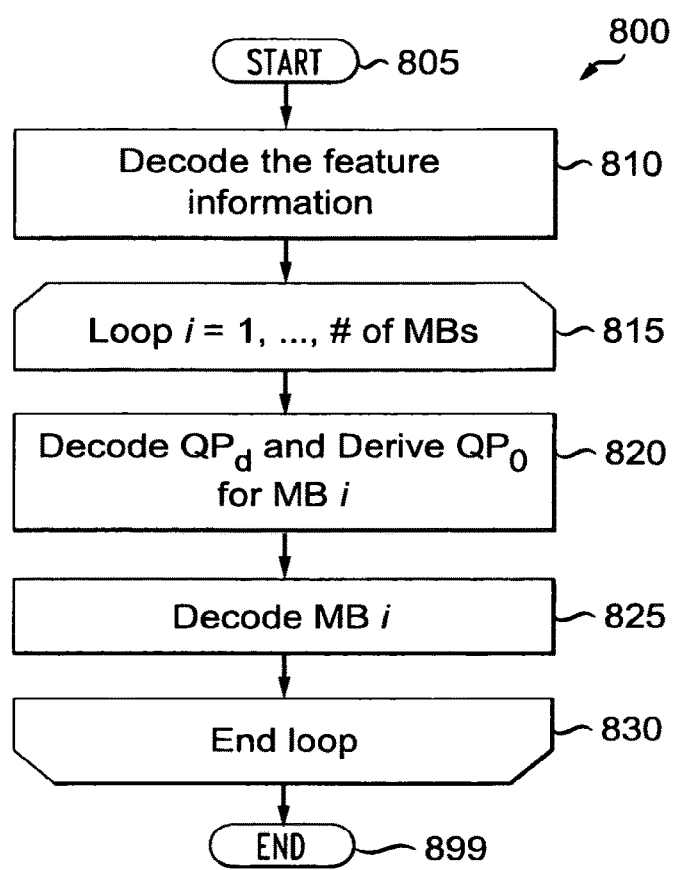
FIG. 8 is a flow diagram showing an exemplary method for decoding an explicit quantization parameter adjustment in conjunction with the use of an embedded quantization parameter map, in accordance with an embodiment of the present principles.

Turning to FIG. 8, an exemplary method for decoding an explicit quantization parameter adjustment in conjunction with the use of an embedded quantization parameter map is indicated generally by the reference numeral 800. The method 800 includes a start block 805 that passes control to a function block 810. The function block 810 decodes global feature information, and passes control to a loop limit block 815. The loop limit block 815 begins a loop over each macroblock in a picture using a variable i having a range from 1 to the # of macroblocks (MBs), and passes control to function block 820. The function block 820 decodes a quantization parameter offset $QP_d$ and derives a quantization parameter $QP_0$ for a current macroblock i, and passes control to a function block 825. The function block 825 decodes macroblock i, and passes control to a loop limit block 830. The loop limit block 830 ends the loop over each macroblock, and passes control to an end block 899.

QP Derivation

In the following, we describe methods to derive the quantization parameters. For a particular method, that same method is used at both the encoder and decoder for synchrony.

Providing high perceptual quality at the region of interest has a pronounced impact in the overall perceptual quality. Hence a general guideline for quantization parameter adjustment is to assign lower quantization parameters to the regions of interest to improve the perceptual quality and higher quantization parameters to other areas to reduce the number of bits. In particular, we explain how to adjust quantization parameters using the spatial activity of the picture measured in variance. For each block, the variance can be calculated using all pixels in the block or a subset of them.

First, we analyze the global feature of the picture. In one embodiment, the average spatial activity (avg_var) is calculated by averaging the variance over all the blocks in a picture. When avg_var is large, them the overall picture is textured, and otherwise smooth. The information avg_var needs to be encoded and sent in the bitstream. To save the overhead, a downscaled version of avg_var can be used.

For each macroblock, we derive the quantization parameter based on avg_var and the local variance (var). Since the local variance is used at both the encoder and decoder, only previously reconstructed information can be used. In one embodiment, we use the average variance of the neighboring blocks, such as left, upper, and/or upper-left blocks. In another embodiment, we use the minimum variance of the neighboring blocks. In yet another embodiment, we use the median value of the variances.

After obtaining the global and local features, we derive the quantization parameter as follows:

$$QP = QP_{pic} + \frac{\alpha \times \text{avg\_var} + \text{var}}{\text{avg\_var} + \alpha \times \text{var}} = QP_{pic} + \frac{\alpha + \frac{\text{var}}{\text{avg\_var}}}{1 + \alpha \times \frac{\text{var}}{\text{avg\_var}}}, \quad (8)$$

where $\alpha$ is a parameter that should be known at both the encoder and decoder, and $QP_{pic}$ is the base quantization parameter for the picture. $\alpha$ controls how strong the QP variation depends on the ratio between var and avg_var, var/avg_var. In an embodiment, to control the dynamic range of the quantization parameter variation, we limit the quantization parameter to $[QP_{pic}-L, QP_{pic}+U]$, where L and U are lower and upper thresholds, respectively, that should also be known and the same at both the encoder and decoder. The formula in Equation (8) assigns a smaller quantization parameter to a macroblock where it is smooth and has a small variance.

To simplify the calculation in Equation (8), a look-up table can be used. For example, we derive the quantization parameter as set forth using the following pseudo code:

$$\begin{aligned}&\text{if } (\text{var} < \beta_1 * \text{avg\_var}) \\ &\quad QP = QP_{pic} + \Delta_1; \\ &\text{else if } (\text{var} < \beta_2 * \text{avg\_var}) \\ &\quad QP = QP_{pic} + \Delta_2; \\ &\text{else} \\ &\quad QP = QP_{pic} + \Delta_3;\end{aligned} \quad (9)$$

where $\beta_i$ and $\Delta_i$ are parameters that should be known at both the encoder and decoder. In the example, we use three different quantization parameter levels. However, it is to be appreciated that the present principles are not limited to the same and, thus, other numbers of levels can be used for the method, while maintaining the spirit of the present principles.

Figure 9:
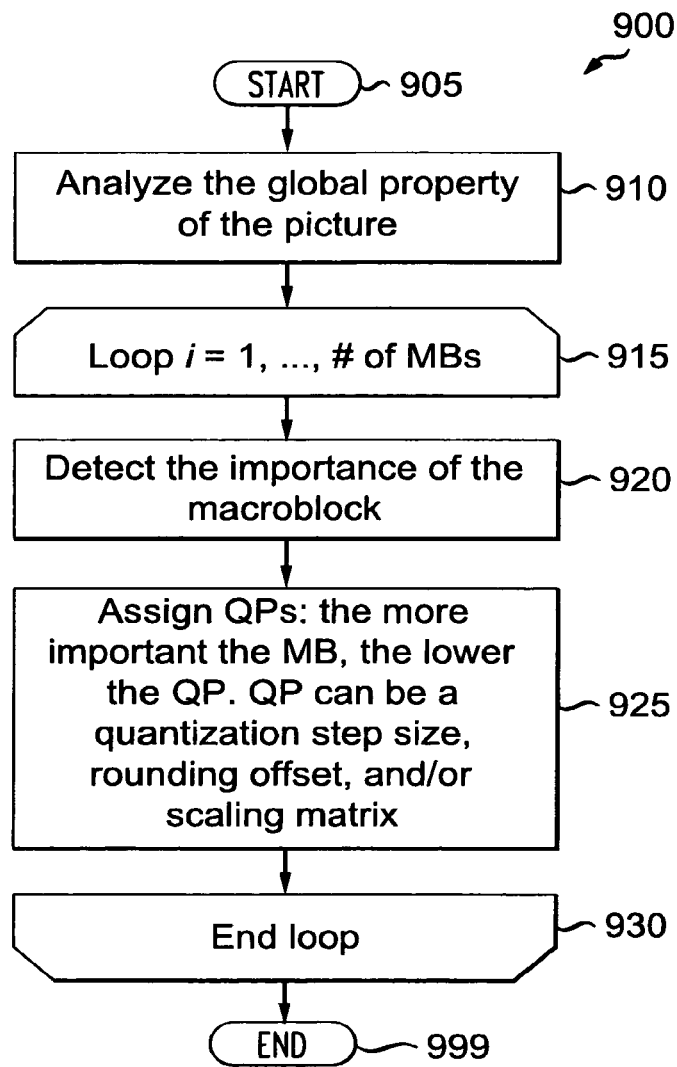
FIG. 9 is a flow diagram showing an exemplary method for assigning quantization parameters in a video encoder, in accordance with an embodiment of the present principles.

Turning to FIG. 9, an exemplary method for assigning quantization parameters in a video encoder is indicated generally by the reference numeral 900. The method 900 includes a start block 905 that passes control to a function block 910. The function block 910 analyzes the global property of the picture, and passes control to a loop limit block 915. The loop limit block 915 begins a loop using a variable i having a range from 1 to the number (#) of macroblocks (e.g., in a current picture), and passes control to a function block 920. The function block 920 detects the importance of a current macroblock, and passes control to a function block 925. The function block 925 assigns the quantization parameters as follows, and passes control to a loop limit block 930: the more important the macroblock, the lower the quantization parameter that is assigned thereto, wherein the quantization parameter can be a quantization step size, a rounding offset, and/or a scaling matrix. The loop limit block 930 ends the loop, and passes control to an end block 999.

Figure 10:
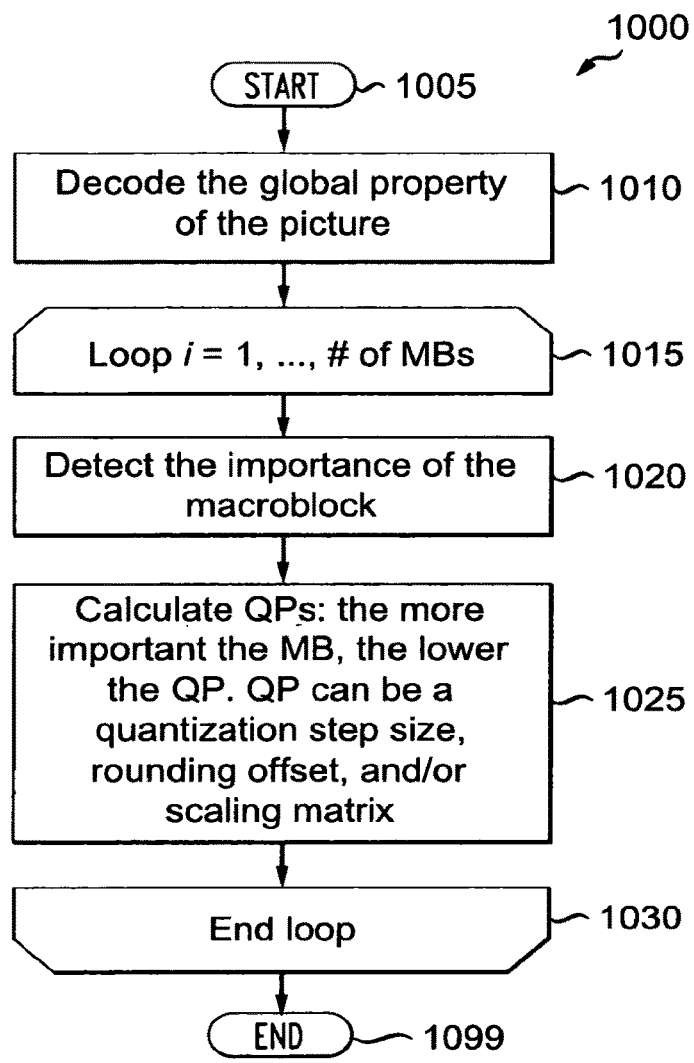
FIG. 10 is a flow diagram showing an exemplary method for calculating quantization parameters in a video decoder, in accordance with an embodiment of the present principles.

Turning to FIG. 10, an exemplary method for calculating quantization parameters in a video decoder is indicated generally by the reference numeral 1000. The method 1000 includes a start block 1005 that passes control to a function block 1010. The function block 1010 decodes the global property of the picture, and passes control to a loop limit block 1015. The loop limit block 1015 begins a loop using a variable i having a range from 1 to the number (#) of macroblocks (e.g., in a current picture), and passes control to a function block 1020. The function block 1020 detects the importance of a current macroblock, and passes control to a function block 1025. The function block 1025 calculates the quantization parameters using the same rule as in the encoder, and passes control to a loop limit block 1030. In general, the more important the macroblock, the lower the quantization parameter is, wherein the quantization parameter can be a quantization step size, a rounding offset, and/or a scaling matrix. The loop limit block 1030 ends the loop, and passes control to an end block 1099.

Figure 11:
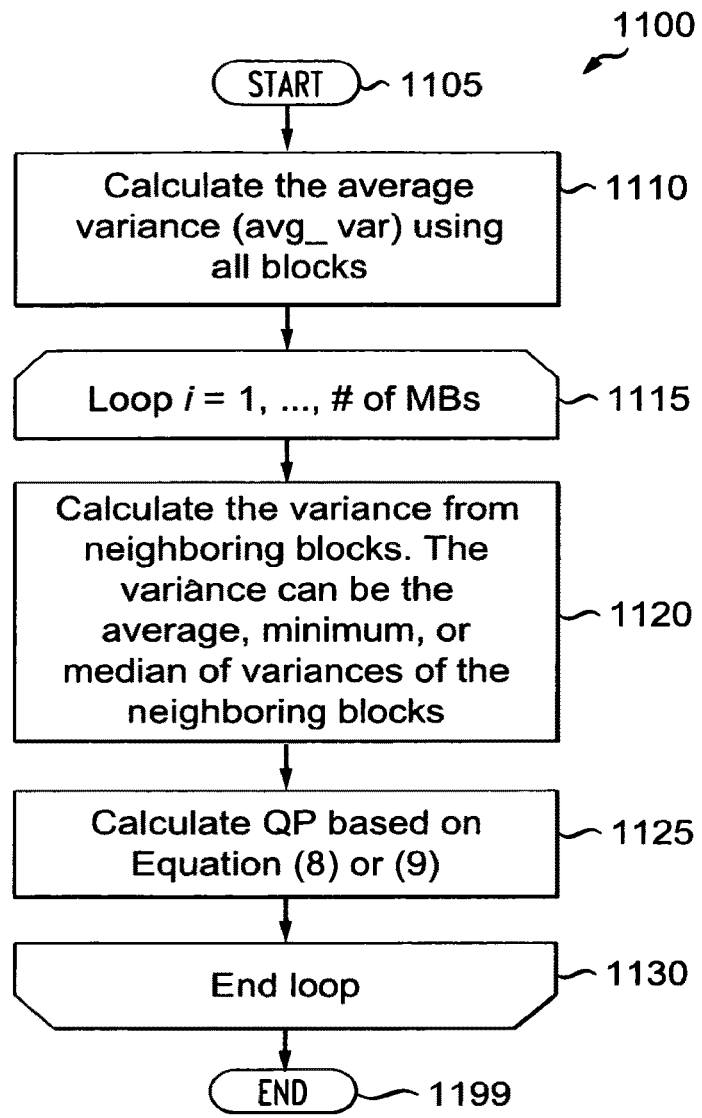
FIG. 11 is a flow diagram showing an exemplary method for assigning quantization parameters in a video encoder, in accordance with an embodiment of the present principles.

Turning to FIG. 11, an exemplary method for assigning quantization parameters in a video encoder is indicated generally by the reference numeral 1100. The method 1100 includes a start block 1105 that passes control to a function block 1110. The function block 1110 calculates the average variance (avg_var) using all blocks, and passes control to a loop limit block 1115. The loop limit block 1115 begins a loop using a variable i having a range from 1 to the number (#) of macroblocks (e.g., in a current picture), and passes control to a function block 1120. The function block 1120 calculates the variance from neighboring blocks where such variance can be, but is not limited to, the average, minimum, or median of variances of the neighboring blocks, and passes control to a function block 1125. The function block 1125 calculates the quantization parameter based on Equation (8) or Equation (9), and passes control to a loop limit block 1130. The loop limit block 1130 ends the loop, and passes control to an end block 1199.

Figure 12:
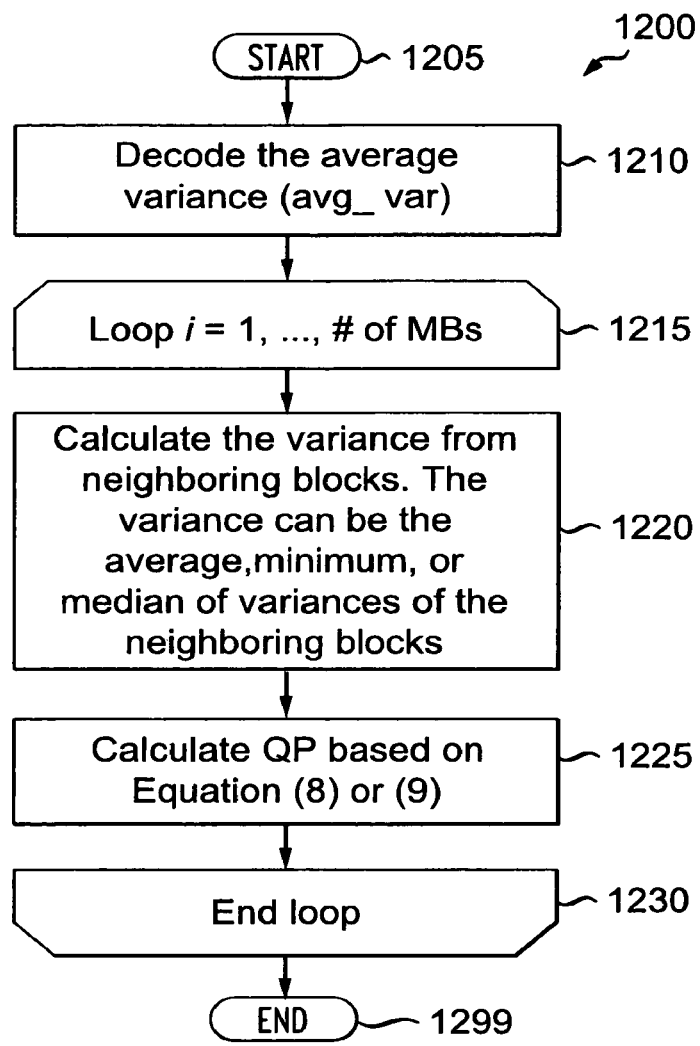
FIG. 12 is a flow diagram showing an exemplary method for calculating quantization parameters in a video decoder, in accordance with an embodiment of the present principles.

Turning to FIG. 12, an exemplary method for calculating quantization parameters in a video decoder is indicated generally by the reference numeral 1200. The method 1200 includes a start block 1205 that passes control to a function block 1210. The function block 1210 decodes the average variance (avg_var), and passes control to a loop limit block 1215. The loop limit block 1215 begins a loop using a variable i having a range from 1 to the number (#) of macroblocks (e.g., in a current picture), and passes control to a function block 1220. The function block 1220 calculates the variance from neighboring blocks where such variance can be, but is not limited to, the average, minimum, or median of variances of the neighboring blocks, and passes control to a function block 1225. The same method of variance calculation is used as in the encoder. The function block 1225 calculates the quantization parameter based on Equation (8) or Equation (9), and passes control to a loop limit block 1230. The loop limit block 1230 ends the loop, and passes control to an end block 1299.

Syntax

To synchronize the encoder and decoder, the global feature, the formula, the look-up table, and their associated parameters in the derivation process should be known at the decoder.

Using the method described in Equation (9) as an example, we describe how to design the syntax to apply the present principles. A syntax element is used to specify whether the embedded quantization parameter is in use. The syntax element can be specified at the picture level or the sequence level. The global feature avg_var of the picture should be specified in the picture level syntax. TABLE 1 shows syntax examples in the picture parameter set, in accordance with an embodiment of the present principles.

TABLE 1

|  | C | Descriptor |
|---|---|---|
| pic_parameter_set_rbsp( ) { | | |
| ... | | |
| embedded_QPmap_flag | 0 | u(1) |
| if(embedded_QPmap _flag) { | | |
| avg_var | | u(v) |
| for (i=0; i<N; i++) { | | |
| beta[ i ] | 0 | u(v) |
| delta [ i ] | 0 | u(v) |
| } | | |
| } | | |
| ... | | |
| } | | |

The semantics of some of the syntax elements in TABLE 1 are as follows:

Embedded_QPmap_flag equal to 1 specifies that an embedded quantization parameter is present in the picture parameter set. Embedded_QPmap_flag equal to 0 specifies that the embedded quantization parameter is not present in the picture parameter set.

Avg_var specifies the value of the average variance for the picture.

Beta_i specifies the parameters in Equation (9).

Delta_i specifies the QP offset in Equation (9).

A description will now be given of some of the many attendant advantages/features of the present invention, some of which have been mentioned above. For example, one advantage/feature is an apparatus having an encoder for encoding picture data for at least a block in a picture. A quantization parameter, applied to one or more transform coefficients obtained by transforming a difference between an original version of the block and at least one reference block, is derived from reconstructed data corresponding to at least the block.

Another advantage/feature is the apparatus having the encoder as described above, wherein a derivation of the quantization parameter from the reconstructed data is performed responsive to at least one of a formula, a look-up table, a global property of the picture and a local property of the block, a variance, luma properties of at least one of the block and the picture, and chroma properties of at least one of the block and the picture.

Yet another advantage/feature is the apparatus having the encoder as described above, wherein a derivation of the quantization parameter from the reconstructed data is performed responsive to a formula known and utilized at both the encoder and a corresponding decoder.

Still another advantage/feature is the apparatus having the encoder as described above, wherein a derivation of the quantization parameter from the reconstructed data is performed responsive to at least one formula, and wherein the at least one formula, an index of the at least one formula, and parameters associated with at least one of the index and the at least one formula are explicitly included in the bitstream.

Moreover, another advantage/feature is the apparatus having the encoder as described above, wherein a derivation of the quantization parameter from the reconstructed data is performed responsive to a global property of the picture and a local property of the block, and wherein the global property of the picture is based on variance.

Further, another advantage/feature is the apparatus having the encoder as described above, wherein, in addition to a default quantization rounding offset, another quantization offset is supported for each of the blocks in the picture including the at least one block, such that the default quantization offset is explicitly signaled and the other quantization offset is implicitly signaled.

Also, another advantage/feature is the apparatus having the encoder as described above, wherein the quantization parameter includes at least one of a quantization step size, a quantization rounding offset, and a quantization scaling matrix.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. In a video encoder, a method, comprising:
   encoding picture data for a block in a picture, wherein a quantization parameter, applied to one or more transform coefficients obtained by transforming a difference between an original version of the block and at least one reference block, is derived from global feature information determined from a preceding analysis of the picture and from an average variance of reconstructed data from neighboring blocks that are above, to the left, or above and to the left of said block, and
   said quantization parameter is further derived using a parameter/weight to control a ratio between a local variance and a global variance in the quantization parameter derivation, and said quantization parameter is limited by lower and upper thresholds around a quantization parameter for the picture.

2. The method of claim 1, wherein a derivation of the quantization parameter from the reconstructed data is performed responsive to at least one selected from the group consisting of:
   a formula,
   a look-up table,
   the global feature information and the variance of reconstructed data local to the block,
   a variance,
   a luma property of the block,
   a luma property of the picture,
   a chroma property of the block, and
   a chroma property of the picture.

3. The method of claim 1, wherein a derivation of the quantization parameter from the reconstructed data is performed responsive to a formula known and utilized at both the video encoder and a corresponding decoder.

4. The method of claim 1, wherein a derivation of the quantization parameter from the reconstructed data is performed responsive to at least one formula, and wherein the at least one formula, an index of the at least one formula, and parameters associated with at least one of the index and the at least one formula are explicitly included in the bitstream.

5. The method of claim 1, wherein a derivation of the quantization parameter from the reconstructed data is performed responsive to the global feature information and the variance of reconstructed data local to the block, and wherein the global feature information of the picture is based on variance.

6. The method of claim 1, wherein, in addition to a default quantization rounding offset, a second quantization offset is supported for a plurality of blocks in the picture, such that the default quantization rounding offset is explicitly signaled and the second quantization offset is implicitly signaled.

7. The method of claim 1, wherein the quantization parameter includes at least one of a quantization step size, a quantization rounding offset, and a quantization scaling matrix.

8. In a video decoder, a method, comprising:
   decoding picture data for a block in a picture, wherein a quantization parameter, applied to one or more transform coefficients obtained by transforming a difference between an original version of the block and at least one reference block, is derived from global feature information in a received bitstream and determined from the picture and from an average variance of reconstructed data from neighboring blocks that are above, to the left, or above and to the left of said block, and
   said quantization parameter is further derived using a parameter/weight to control a ratio between a local variance and a global variance in the quantization parameter derivation, and said quantization parameter is limited by lower and upper thresholds around a quantization parameter for the picture.

9. The method of claim 8, wherein a derivation of the quantization parameter from the reconstructed data is performed responsive to at least one selected from the group consisting of:
   a formula,
   a look-up table,
   the global feature information and the variance of reconstructed data local to the block,
   a variance,
   a luma property of the block,
   a luma property of the picture,
   a chroma property of the block, and
   a chroma property of the picture.

10. The method of claim 8, wherein a derivation of the quantization parameter from the reconstructed data is performed responsive to a formula known and utilized at both an encoder and a corresponding decoder.

11. The method of claim 8, wherein a derivation of the quantization parameter from the reconstructed data is performed responsive to at least one formula, and wherein the at least one formula, an index of the at least one formula, and parameters associated with at least one of the index and the at least one formula are explicitly included in the bitstream.

12. The method of claim 8, wherein a derivation of the quantization parameter from the reconstructed data is performed responsive to the global feature information and the variance of reconstructed data local to the block, and wherein the global feature information of the picture is based on variance.

13. The method of claim 8, wherein, in addition to a default quantization rounding offset, a second quantization offset is supported for a plurality of blocks in the picture, such that the default quantization rounding offset is explicitly signaled and the second quantization offset is implicitly signaled.

14. The method of claim 8, wherein the quantization parameter includes at least one of a quantization step size, a quantization rounding offset, and a quantization scaling matrix.

15. A computer readable storage media having video signal data encoded thereupon, comprising:
   picture data encoded for a block in a picture, wherein the picture data is decoded by a decoder, and wherein a quantization parameter, applied to one or more transform coefficients obtained by transforming a difference between an original version of the block and at least one reference block, is derived by the decoder from global feature information in a decoded bitstream and determined from the picture and from an average variance of reconstructed data from neighboring blocks that are above, to the left, or above and to the left of said block, and
   said quantization parameter is further derived using a parameter/weight to control a ratio between a local variance and a global variance in the quantization parameter derivation, and said quantization parameter is limited by lower and upper thresholds around a quantization parameter for the picture.

16. An apparatus, comprising:
   an encoder operating on picture data for a block in a picture, wherein a quantization parameter, applied to one or more transform coefficients obtained by transforming a difference between an original version of the block and at least one reference block, is derived from global feature information determined from a preceding analysis of the picture and from an average variance of reconstructed data from neighboring blocks that are above, to the left, or above and to the left of said block, and
   said quantization parameter is further derived using a parameter/weight to control a ratio between a local variance and a global variance in the quantization parameter derivation, and said quantization parameter is limited by lower and upper thresholds around a quantization parameter for the picture.

17. An apparatus, comprising:
   a decoder operating on picture data for a block in a picture, wherein a quantization parameter, applied to one or more transform coefficients obtained by transforming a difference between an original version of the block and at least one reference block, is derived from global feature information in a received bitstream and determined from the picture and from an average variance of reconstructed data from neighboring blocks that are above, to the left, or above and to the left of said block, and
   said quantization parameter is further derived using a parameter/weight to control a ratio between a local variance and a global variance in the quantization parameter derivation, and said quantization parameter is limited by lower and upper thresholds around a quantization parameter for the picture.

* * * * *